April 8, 1952     T. O. LILLQUIST     2,591,840
GENERATING ELECTRIC TRACTION AND CONTROL SYSTEM
Filed Jan. 2, 1948     2 SHEETS—SHEET 1

Inventor
Torsten O. Lillquist
By
Spencer, Willits, Helmig & Baillie
Attorneys

Patented Apr. 8, 1952

2,591,840

UNITED STATES PATENT OFFICE 2,591,840

GENERATING ELECTRIC TRACTION AND CONTROL SYSTEM

Torsten O. Lillquist, Hinsdale, Ill., assignor to General Motors Corporation, Detroit, Mich., a corporation of Delaware Application January 2, 1948, Serial No. 156

10 Claims. (Cl. 105—73)

1

The present invention generally relates to generating electric traction and control systems for locomotives and more particularly to control means associated therewith for checking slippage of the traction wheels.

The principal object of the present invention is to provide simple control means which acts in response to unbalanced electrical conditions in different power circuit relations of the traction motors resulting in unbalanced speed between the motors driving individual wheeled axles of the locomotive to properly reduce the power supplied the motors and thereby check overspeeding or slippage of any traction wheel and to properly restore the power supplied to the motors and restore balanced speed and electrical conditions therebetween to prevent further slippage of the wheels.

The combined traction and control system by which the above object is accomplished will become apparent by reference to the following description thereof and the accompanying drawings illustrating a system which is particularly adapted for a locomotive.

Figure 1:
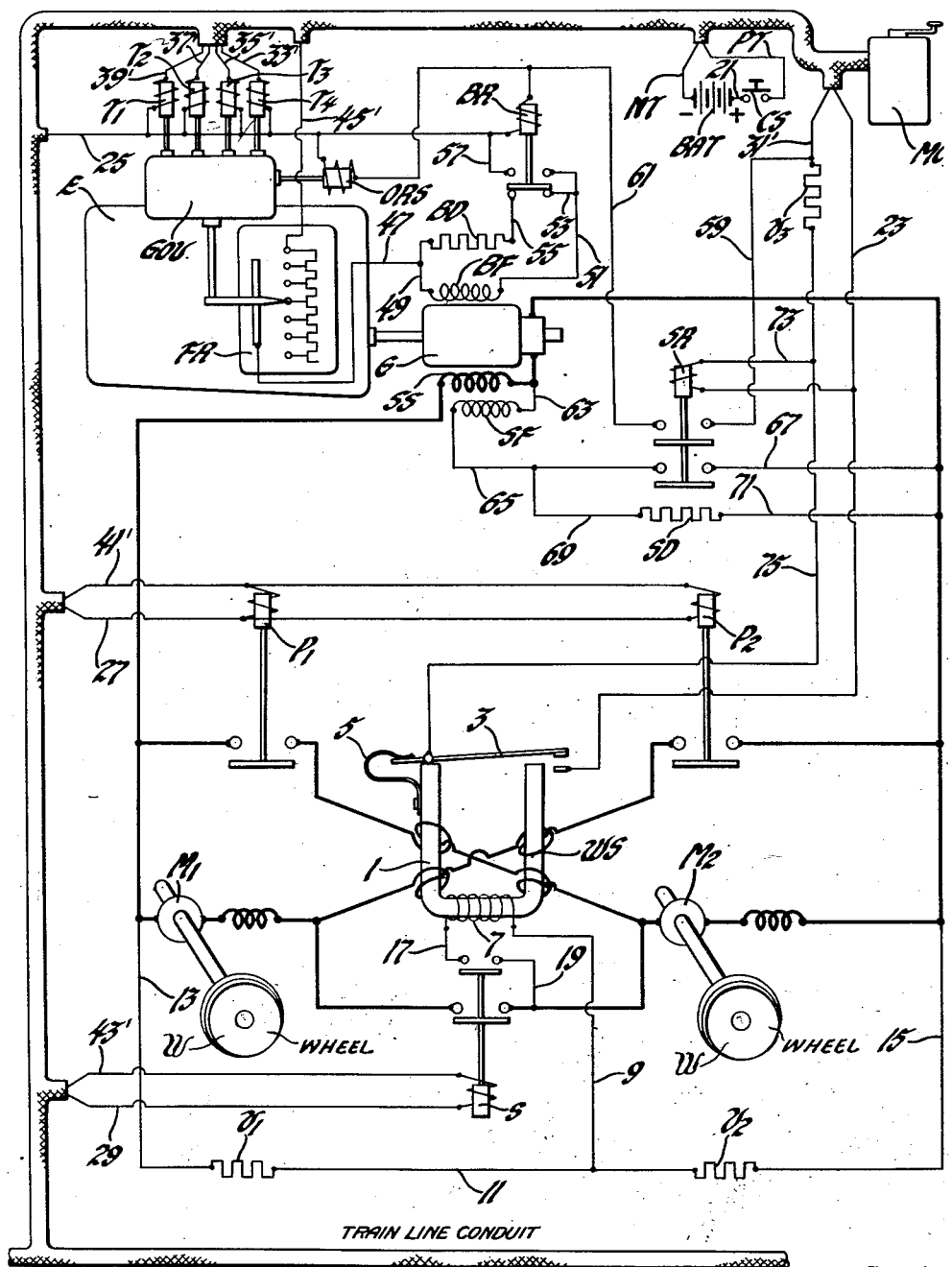

Figure 1 of the drawings is a schematic drawing of the combined traction and control apparatus and the power and control connections.

Figure 2:
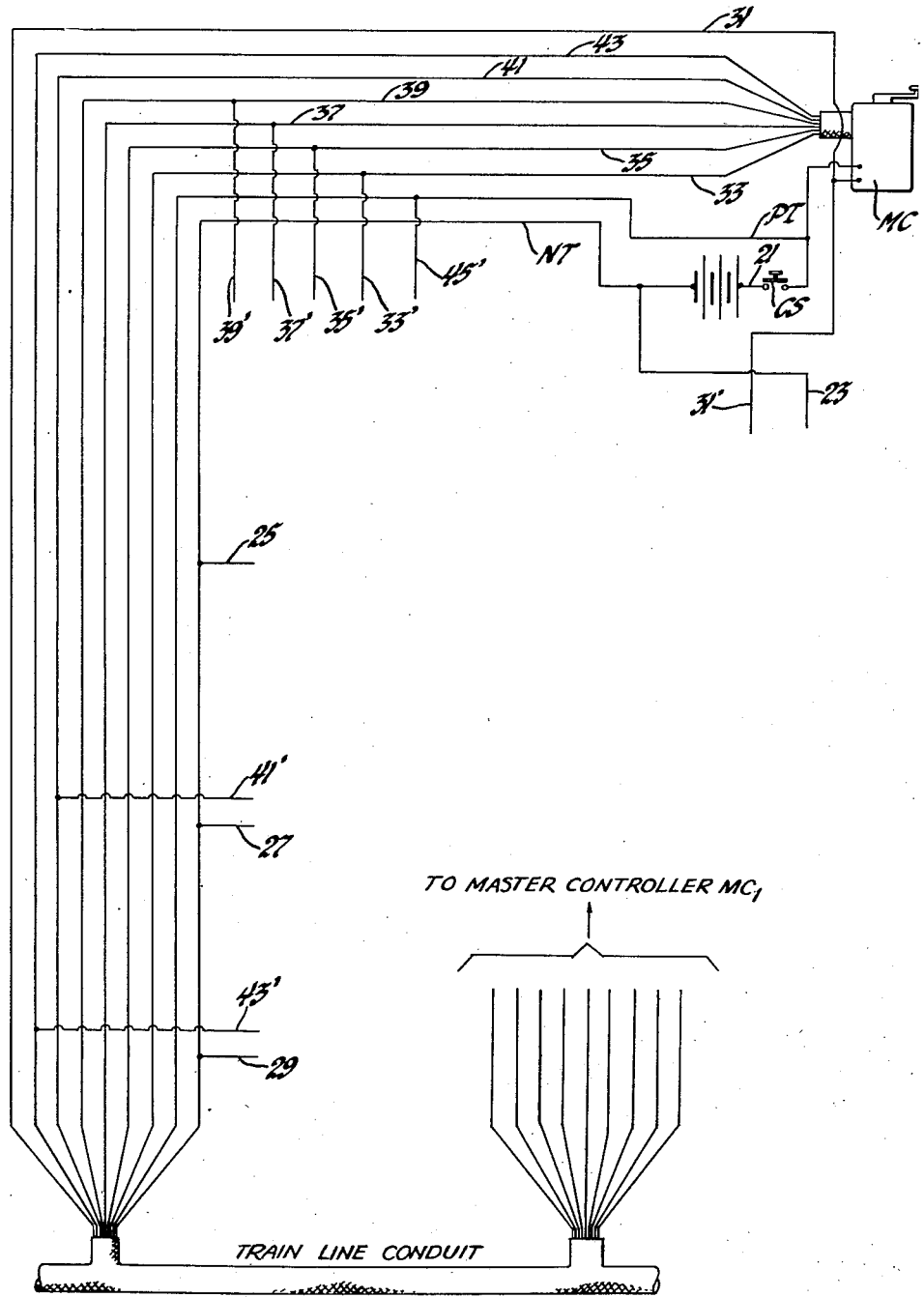

Figure 2 of the drawings is an enlarged view of a portion of Figure 1 with the train line conduit broken away in order to show the train line control conductors therein to better advantage.

The locomotive generating electric traction and control system, illustrated diagrammatically, comprises a power plant including a prime mover E, of the diesel type and directly connected to a compound electric generator G driven thereby for supplying power to a pair of series type electric traction motors M1—M2. These motors are operatively connected in conventional manner to separate locomotive driving axles provided with traction wheels W. The generator G and motors M1—M2, together with switching means S—P1—P2 are included in a power circuit, shown in heavy lines on the drawing, for connecting the motors in series or in parallel power circuit relation with the generator. The power plant is provided with a conventional speed responsive governor mechanism GOV for regulating the speed, load and output thereof. The governor GOV has electromagnetic speed response varying means T1—T2—T3—T4 which is controlled by a manually operated master controller MC which also controls the switching means S—P1—P2. A wheel slip relay WS is associated with the motor power circuits and is responsive to unbalanced electrical and speed conditions of the motors for controlling the power plant speed, load and output regulating means independently of the master

2 controller MC to properly check these unbalanced conditions and restore this balance.

The switching means includes a series contactor S and two parallel contactors P1—P2. Each of these contactors is provided with an electromagnetic actuating winding and an armature having a power contact movable from an open circuit position to a closed or bridging circuit relation with the stationary power contacts thereon. The series contactor S is also provided with an armature interlocking contact which is also moved into closed or bridging circuit relation with a pair of stationary interlocking contacts simultaneously with closure of the power contacts.

The wheel slip relay includes a U-shaped magnetizable yoke 1, and armature 3 pivotally mounted on one leg of the yoke and spring biased by a spring 5 away from the other leg to hold a contact on the armature in spaced relation with a stationary contact and a magnetizing winding 7 on the yoke 1. The winding 7 is connected so that both terminals are in equipotential relation with both terminals of the generator when the motors M1—M2 are connected in series with the generator and when there are balanced voltage and speed conditions present between the motors by reason of the following connections. It will be noted that one winding terminal of the relay WS is connected by a conductor 9 to a conductor 11 connecting adjacent terminals of two resistors V1—V2 of equal resistance values. The opposite terminal of the resistor V1 is connected by a conductor 13 to a power conductor connected to one generator armature terminal and the opposite terminal of the resistor V2 is connected by a conductor 15 to another power conductor connected to the opposite generator armature terminal. The other winding terminal of the relay is connected by conductors 17—19 in series circuit relation with the interlocking contacts of the series contactor S to one of a pair of power conductors between the motors which are connected to the respective stationary power contacts of the series contactor S which are bridged to connect the motors in series circuit relation across the generator G. It will be evident that when the motors are in series circuit relation and operating at the same speed, equal voltages are present across each motor and as there is also equal voltage across each of the resistors V1 and V2 both terminals of the winding 7 of the wheel slip relay are in equipotential relation with both sides of the generator power circuit and no current will flow in this winding. Should, however, the traction wheels driven by one motor slip the speed and voltage between the motors is unbalanced resulting in current flow through the winding 7 of the wheel slip relay WS and magnetization of the yoke which causes closure of the contacts thereof.

It will likewise be noted that when the power contacts of each of the parallel contactors P1—P2 are bridged the separate power conductors connecting each motor across the generator G extend in opposite directions through the U-shaped yoke 1 of the wheel slip relay WS and the yoke is accordingly in opposed or differential flux linkage relation with each of these conductors and remains demagnetized as long as there is balanced current flow between the motors and in opposite directions through the relay yoke. When one parallel connected pair of motors overspeeds the current balance between the motors is destroyed and the yoke of the wheel slip relay is then magnetized by the differential in flux induced therein causing closure of the relay contacts.

The various control means and connections between the wheel slip relay WS, master controller MC, series parallel switching means S—P1—P2 and the governor speed response varying means T1—T2—T3—T4 will now be described whereby unbalanced speed and electrical conditions between the motors are checked and are properly rebalanced to prevent recurrence of these unbalanced conditions resulting from slippage of any of the traction wheels.

The governor GOV is of the conventional isochronous type having combined hydraulic power apparatus controlled thereby for regulating the fuel supplied to the diesel engine prime mover E and a generator field rheostat FR to control the excitation and output of the generator G to maintain the speed, load and output of the power plant constant, and also includes speed response varying means operated by the electromagnetically controlled means T1—T2—T3—T4. These means are energizable separately and in various combinations to cause operation of the power plant at any one of a plurality of constant values of speed, load and output in a well known manner. An electromagnetically actuated governor overriding solenoid ORS is also provided to start movement of the generator field rheostat FR by the hydraulic power means in proper direction to cause a reduction in the generator excitation and output when this solenoid is deenergized.

The generator G is provided with a series field winding SS shown connected in series with the armature in the power circuit, a shunt field winding SF and a battery excited field winding BF. A battery field relay BR and a shunt field relay SR are provided to control energization of the overriding solenoid ORS and the battery and shunt of the solenoid generator field windings and deenergization thereof and discharge of the field windings through a battery field discharge resistor BD and a shunt field discharge resistor SD. A battery BAT furnishes energization for the generator battery field winding BF and for various electromagnetically actuated means mentioned above which are under control of the master controller MC and wheel slip relay WS.

The positive terminal of the battery BAT, as best shown in Figures 1 and 2, is connected to one contact of a manually operable control switch CS by a conductor 21, the other terminal of which is connected to a positive train line conductor PT shown extending into a train line conduit and connected to the master controller MC, as best shown in Figure 2. A negative train line conductor NT is connected to the negative battery terminal and extends through the train line conduit, as shown in Figures 1 and 2, and branch return conductors 23—25—27—29 leading therefrom are shown extending from the train line conduit to one winding terminal of each of the above mentioned electromagnetic means. The conductor NT and branch return conductors 23—25—27—29 connected thereto are shown to better advantage in Figure 2. Separate branch train line control conductors 31'—33'—35'—37'—39'—41'—43' are connected to the other winding terminals of the electromagnetic means SR—T1—T2—T3—T4—S—P1—P2 and are shown entering the line conduit and these branch conductors are shown in Figure 2 connected to the master controller MC by train line conductors 31—33—35—37—39—41—43. Manual operation of the master controller MC controls energization of the electromagnetic means T1—T2—T3—T4 and SR in proper combinations from the battery BAT to cause operation of the power plant at any one of a plurality of constant values of speed, load and output and also controls energization of the series contactor S or parallel contactors P—P1 for connecting the motors in series or parallel circuit relation with the generator. The train line control conductors PT, NT, 31, 33, 35, 37, 39, 41 and 43 in the train line conduit are provided to be connected in multiple with similar train line control conductors on other similar locomotive units for multiple control of similar electromagnetically actuated means thereon by a master controller MC on any locomotive unit. For illustration only two master controllers MC and MC1 are indicated in Figure 2.

A branch train line conductor 45' is shown in Figure 1 connected to one terminal of the generator field rheostat FR and this branch train line conductor extends into the train line conduit and is connected to the positive train line conductor PT shown in Figure 2 connected to the master controller MC and the positive battery terminal by conductor 21 and switch CS. The other rheostat terminal is connected by conductors 47—49 to separate terminals of the generator battery field winding BF and discharge resistor BD therefor. The other terminal of the battery field winding is connected by conductors 51—53 to one stationary contact of each of the upper and lower pair on the battery field relay BF. The other terminal of the discharge resistor BD is connected by a conductor 55 to the other lower contact of the relay BR and the other upper relay contact is connected by a conductor 57 to the branch return train line conductor 25 to which one winding terminal of the electromagnetic means T1—T2—T3—T4—ORS and the relay BR are connected. The relay BR is shown provided with an armature having a contact normally bridging the lower pair of stationary contacts to connect the battery field winding BF across the discharge resistor BD. The armature contact of the relay BR is movable upwardly into bridging relation with the upper pair of stationary contacts when the winding is energized to cause energization of the battery field winding BF through positive train line conductor PT, branch conductor 45', the field rheostat FR, conductors 47—49—51—57, branch return conductor 25' and negative train line conductor NT. Energization of the windings of the relay BR and overriding solenoid ORS for the governor GOV takes place through the upper pair of stationary contacts of the shunt field relay SR when its winding is energized which causes the armature contact thereof to bridge the upper stationary contacts. One of the upper stationary contacts of the shunt relay SR is connected to the branch train line conductor 31' by a conductor 59 and the other upper contact is connected by the conductor 61 to the other winding terminals of the relay BR and the overriding solenoid ORS. The lower stationary contacts of the shunt field relay are connected in series with the generator shunt field winding SF across the generator armature terminals by conductors 63—65—67 and the shunt field discharge resistor SD is connected across the lower contacts of the shunt field relay by conductors 69—71. The shunt field relay is provided with a second armature contact which bridges the lower stationary contacts when the relay winding is energized to shunt the discharge resistor SD out of the shunt field circuit. The other winding terminal of the shunt field relay SR is connected by a conductor 73 to a conductor 75 connected to one contact of the wheel slip relay WS and one terminal of a current limiting resistor V3, the other terminal of which is connected to the branch train line control conductor 31'. The other contact of the wheel slip relay is connected to the return train line conductor 23 and it will be evident that when the contacts of the wheel slip relay WS close the winding of the shunt field relay SR is shunted to cause opening of the upper and lower contacts thereof which causes discharge of the shunt field winding SF and deenergization of the windings of the governor overriding solenoid ORS and battery field relay BR which causes deenergization and discharge of the generator battery field winding BF. This results in a drastic reduction in the generator excitation and output and starts movement of the generator field rheostat to the reduced excitation position.

With the above described generating electric traction and control system for a locomotive unit when the control switch CS is closed and the master controller MC is manually moved to an operative position to cause the power plant to operate at a selected constant value of speed, load and output and with the motors M1—M2 connected in series power circuit relation with the generator G of the power plant the following control circuits are energized. The winding of the shunt field relay SR is energized through conductors 21, PT, 31', the resistor V3 and conductors 73, 23 and NT and its contacts close. This shunts the discharge resistor SD out of the generator shunt field winding SR and causes energization of the windings of the battery field relay BR and the overriding solenoid ORS through conductors 31, 31', 59, 61, 25 and NT. Energization of the winding of the relay BR causes closure of the upper pair of contacts to complete the generator battery field winding through conductors 21, PT, 45', field rheostat FR, and conductors 47, 49, 51, 57, 25 and NT. The generator shunt, series, and battery fields are energized, the battery field current being limited by the governor operated field rheostat FR to control the load on the generator G and therefore the load and output of the prime mover E. One or more of the electromagnetic governor speed response varying means T1—T2—T3—T4 are energized to cause operation of the prime mover E at a corresponding speed, load and output.

It will be evident that the above mentioned train line conductors included in the train line conduit provide the means whereby other locomotive units of this type may be connected and operated in multiple by operation of the control switch CS and any master controller MC on any multiple connected locomotive unit.

As explained with the motors connected in series and balanced speed and electrical conditions therebetween the winding 7 of the wheel slip relay is deenergized and upon an unbalance in these conditions resulting from slippage of any traction wheel the relay winding is energized causing closure of the contacts of the relay. This shunts the winding of the shunt field relay SR and causes opening of both pairs of relay contacts. Opening of the lower contacts causes the discharge resistor SD to be connected in series with the shunt field winding SF to lower the generator excitation and output. The simultaneous opening of the upper contacts of the relay SR causes deenergization of the governor overriding solenoid ORS causing movement of the field rheostat FR in the battery field circuit to a reduced field position and also causes deenergization of the winding of the battery field relay to cause the opening of its upper contacts and the closure of the lower contacts. The opening of the upper contacts deenergizes the battery field winding BF and the closure of the lower contacts causes this field winding to be connected across the discharge resistor BD. The battery field excitation is accordingly simultaneously drastically reduced so that the generator output is drastically reduced to both motors and unbalanced speed and voltage conditions are checked to stop wheel slip shortly after. This causes deenergization of the winding and opening of the contacts of the wheel slip relay WS which allows the winding of the shunt relay to be reenergized causing reclosure of the contacts to cause reenergization of the shunt field SF. This also causes reenergization of the winding and reclosure of the upper contacts of the relay BR and reenergization of the battery field winding BF but at less current value as the field rheostat FR has been moved to a position to reduce the battery field excitation. The governor overriding solenoid ORS is also reenergized simultaneously with the winding of the relay BR to discontinue its overriding action of the governor and the rheostat FR will accordingly move back to its original increased field position. It will be evident that upon the occurrence of unbalanced speed and voltage conditions between the series connected motors, the generator excitation is drastically reduced to check wheel slip and restore this balance and the rheostat is moved to a reduced field position. Upon the restoration of this balance the generator is reexcited at reduced field which is then increased to its original value as the overriding action of the solenoid on the governor is canceled upon reexcitation of the generator to prevent reoccurrence of wheel slip and unbalance in speed and voltage between the motors.

This same action occurs when the controller MC is moved to another operating position to cause transition of the traction motor power connections between the series and parallel power circuit relation with the generator. In this case the wheel slip relay is energized by unbalanced speed and current between the parallel connected motors.

This control system including a simple and rugged wheel slip relay WS is found to respond to slight unbalanced speed and electrical condition between the motors and acts promptly to check traction wheel slip and preclude subsequent slip on locomotives of the generating electric type operating under bad rail conditions.

I claim:

1. In a traction and control system, a generating electric power plant, means for reducing the power output thereof, a pair of electric traction motors, power connections including switching means for connecting the motors in series or parallel power circuit relation with the power plant and a relay for controlling the power plant output reducing means, said relay having magnetizable means directly associated with said power connections and an electromagnetic winding on said magnetizable means and connected to said power connections by said switching means to cause said relay to act in response to unbalanced electrical conditions between the motors when connected in either power circuit relation with the power plant to cause a reduction in the output thereof and check further unbalance between the motors and to restore the balance therebetween and the power output thereto.

2. In a traction and control system for a locomotive having traction wheels, a generating electric power plant, power output controlling means therefor, a pair of electric traction motors for driving separate locomotive traction wheels, power connections including series and parallel switching means for connecting the motors in series or parallel power circuit relations with said power plant and a relay for controlling the power plant output controlling means to reduce the power output thereof, said relay acting in response to slight unbalanced voltage conditions resulting from a slight difference in speed between the motors when series connected and to slight unbalanced current conditions between the motors resulting in a slight difference in speed when parallel connected to reduce the power supplied thereto and check further unbalance and restore the power supplied to and balance in speed and electrical conditions between the motors.

3. In a traction and control system for a locomotive having traction wheels, a generating electric power plant having power output controlling means, a pair of electric traction motors each driving separate locomotive traction wheels, separate power connections for each motor including series and parallel switching means for connecting the motors in series or parallel power circuit relation with said power plant, a relay for controlling the output controlling means for said power plant, said relay being responsive to operation of said switching means, one electromagnetic means forming a part of said relay and in differential balanced current relationship with said separate motor power connections for responding to unbalanced voltage conditions between said motors for controlling the power consumption of said motors and for maintaining speed and voltage balance between said motors when they are series connected, and other electromagnetic means forming another part of said relay for responding to unbalanced current conditions between said motors for controlling the power consumption of said motors and for maintaining speed and current balance between said motors when the motors are parallel connected.

4. In a traction and control system for a locomotive having traction wheels, a pair of electric traction motors driving separate locomotive traction wheels, a generating electric power plant for said motors, power output regulating means for said power plant, power connections including series and parallel switching means for connecting said motors in series or parallel power circuit relation with said power plant, and a relay for controlling said power output regulating means, said relay being responsive to operation of said switching means, said relay including one magnetic circuit means in differential balanced magnetic flux interlinking relationship with the power connections for said motors, said one magnetic circuit means being responsive to unbalanced voltage connections when the motors are connected in series, and other magnetic circuit means responsive to unbalanced current conditions when the motors are connected in parallel, each of said magnetic circuit means being respectively operative to maintain speed and power balance between said motors.

5. In a traction and control system for a locomotive having traction wheels, a pair of traction motors each driving separate locomotive traction wheels, a generating electric power plant for said motors and including power output regulating and cutoff means, power connections including series and parallel switching means for connecting the motors in series or parallel power circuit relation with said power plant, a pair of resistors of equal resistance value connected in series with the power plant and a control relay for said power plant output regulating and cutoff means, said relay including a magnetizable element, and a magnetizing winding connected by said series switching means in equipotential relationship between said series connected motors and said resistors to act in response to slight unbalanced voltage conditions between said motors, said magnetizable relay element enclosing and in opposed flux interlinking relationship with the power conductors connecting the motors in parallel with said power plant to act in response to slight unbalance in current conditions resulting from a slight difference in speed of the motors when connected in parallel, the action of said relay for either of these unbalanced conditions causing a reduction and cutoff of power supplied thereto to check further unbalance in the speed between the motors to restore the speed balance therebetween and thereby cause resumption of and an increase in the power supplied to the motors.

6. In a traction and control system for a locomotive having traction wheels, a pair of electric traction motors each driving separate locomotive traction wheels, a generating electric power plant for said motors, speed, load and output regulating means for said power plant for causing different constant values of power to be supplied to said motors, power connections including series and parallel switching means for connecting the motors in series or parallel power circuit relation with said power plant, a manually operable controller for controlling said regulating means and said switching means, means operable for overriding control of said regulating means by said controller to cause a reduction in the power output of said power plant, and a relay associated with said motor power connections and acting only upon an unbalance in electrical conditions between said motors resulting from unbalanced speed conditions when connected in either series or parallel with the power plant to cause operation of said overriding means of said regulating means and thereby reduce the output to said motors to check further unbalance and restore the balance therebetween and restore the power output supplied the motors to its original value.

7. In a traction and control system for a locomotive having traction wheels, a pair of electric traction motors each driving separate locomotive traction wheels, a power plant for said motors including a diesel engine prime mover having a fuel regulator and an electric generator driven thereby having an excitation system including a field rheostat and switching means for exciting and discharging the excitation system, a governor having speed response varying means and acting in response to the speed of the power plant for controlling the fuel regulator and the generator field rheostat to cause operation of the power plant at any one of a plurality of constant values of speed, load and output depending upon the setting of said governor speed response varying means, governor overriding means operable to cause movement of the rheostat to reduce the generator excitation and output, power connections including series and parallel switching means for connecting the motors in series or parallel power circuit relation with said generator, a manually operable controller for controlling said governor speed response varying means, said generator excitation switching means to cause excitation of said generator, and said series or said parallel motor switching means, and a relay associated with said motor power connections and acting only in response to unbalanced electrical conditions between said motors for controlling said governor overriding means and said generator excitation switching means to cause discharge of said generator excitation system and movement of said rheostat to the reduced field position thereby checking the further unbalance and restoring balanced conditions between said motors and reexcitation of said generator and the return of said field rheostat to its original position.

8. In a traction and control system for a locomotive having traction wheels, a pair of electric traction motors each driving separate locomotive traction wheels, a power plant for said motors comprising a diesel prime mover having fuel control means and an electric generator driven by said engine and having an excitation system including a rheostat for varying generator excitation and switching means for exciting and for discharging the excitation system, a governor acting in response to the speed of the prime mover for controlling the fuel control means of said engine and the rheostat in said generator excitation system to cause operation of said power plant at constant speed, load and output, said governor also having speed response varying means operable to cause operation of said power plant at different constant values of speed, load and output, overriding means for said governor to adjust said rheostat and cause a reduction in the excitation of said generator, power connections including series and parallel switching means for connecting the motors in series or in parallel power circuit relation with said generator, a manually operable master controller, train line and control connections between said controller and said governor speed response varying means, said generator excitation switching means, and said series and said parallel motor connecting means, said train line and control connections being adapted for connection in multiple with similar control apparatus on other locomotive units for control in multiple therewith, and a relay associated with said power connections and acting only in response to unbalanced electrical conditions between said motors when connected in series or in parallel for controlling said governor overriding means and said generator excitation switching means to cause movement of said rheostat to the reduced field position and discharge of said generator excitation system thereby checking further unbalance and restoring balanced motor conditions and reexcitation of said generator and the return of said rheostat to the original position.

9. In a traction and control system for a locomotive having traction wheels, electric traction motors driving separate locomotive traction wheels, a generating electric power plant supplying power to the traction motors, power output control means for the power plant, separate traction motor power connections including means for connecting the motors in parallel with the power plant, a control relay controlling the power output control means, said relay having a magnetic yoke in enclosing and balanced differential flux linkage relation with each of the separate motor power connections and acting in response to unbalanced electrical conditions in the separate motor power connections upon slippage of any motor driven wheel to reduce the power output of the power plant and check wheel slippage and to restore balanced electrical conditions in the separate motor power connections.

10. In a traction and control system for a locomotive having traction wheels, electric traction wheels driving separate traction wheels, a generating electric power plant having output reducing and output varying means, a control relay controlling the output reducing and varying means, separate motor power connections including parallel switching means for connecting the motors in parallel with the power plant, a third motor power connection including series switching means for connecting the motors in series with said power plant, said control relay having a magnetic yoke in enclosing and normally balanced differential current relation with each of said separate motor power connections upon connection of the motors in parallel by the parallel switching means and a winding on said relay yoke connected in equipotential relation with the motors and power plant by the series switching means when the motors are connected in series with the power plant, said relay acting upon unbalanced current and voltage conditions of the motors to cause a reduction in the power output of the power plant upon slippage of any motor driven wheel to check slippage and restore balanced electrical conditions of the motors and to increase the output of the power plant, to the motors, to the original value.

TORSTEN O. LILLQUIST.

REFERENCES CITED

The following references are of record in the file of this patent:

UNITED STATES PATENTS

| Number | Name | Date |
|---|---|---|
| 2,286,680 | Hines | June 16, 1942 |
| 2,403,933 | Lillquist | July 16, 1946 |

FOREIGN PATENTS

| Number | Country | Date |
|---|---|---|
| 596,097 | Germany | Apr. 26, 1934 |